Figure 1:
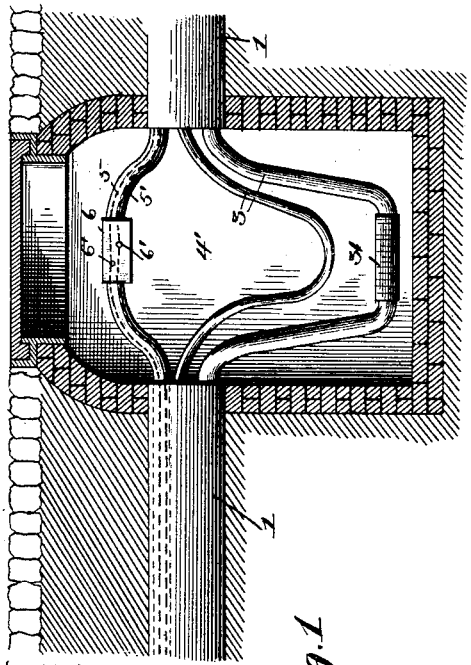

(No Model.) 2 Sheets—Sheet 1.

E. E. RIES.
METAL WORKING.

No. 499,040. Patented June 6, 1893.

Witnesses:
J. B. McGirr.
F. T. Chapman.

Inventor,
Elias E. Ries,
By Joseph Lyons
Attorney.

(No Model.) 2 Sheets—Sheet 2.
E. E. RIES.
METAL WORKING.

No. 499,040. Patented June 6, 1893.

Witnesses:
J. B. McGirr.
F. T. Chapman.

Inventor,
Elias E. Ries,
By Joseph Lyons.
Attorney.

UNITED STATES PATENT OFFICE.

ELIAS E. RIES, OF BALTIMORE, MARYLAND, ASSIGNOR TO RIES & HENDERSON, OF SAME PLACE.

METAL-WORKING.

SPECIFICATION forming part of Letters Patent No. 499,040, dated June 6, 1893.

Application filed December 3, 1890. Serial No. 373,447. (No model.)

*To all whom it may concern:*

Be it known that I, ELIAS E. RIES, a citizen of the United States, and a resident of Baltimore, in the State of Maryland, have invented certain new and useful Improvements in Apparatus for Electrically Producing Continuous Metallic Line Structures, of which the following is a specification.

In Letters Patent No. 370,282, granted to me on September 20, 1887, and in my application for Letters Patent, Serial No. 360,743, filed August 2, 1890, I have shown and described portable apparatus for working metals electrically, and more especially, for electric welding. The apparatus and devices therein shown are particularly adapted for welding together sections of pipe, electric conductors, or other continuous line structures, after the parts thereof have been placed in position, or while they are being placed in position. In the said patent and pending application the source of heating or welding current has been shown by me as being movable with the other parts of the welding apparatus, inasmuch as the number of line structures composed of the sections of rails, pipe or electric conductors, to be electrically united thereby are comparatively few, and are generally so located as to not only require a portable welding apparatus, but also a movable generator or source of welding or metal-heating current for the same. When currents of considerable quantity are needed, as is the case in the welding of heavy line structures, or when a large number of wires or other conductors are to be welded and permanently laid along a common trench, highway, or other support, either together or at frequently recurring intervals, the transportation from place to place of the heavy and cumbersome source of current is both inconvenient and expensive. This inconvenience is more especially felt in the case where the line structures to be operated upon are deposited in trenches and conduits, which are necessarily narrow, and do not admit of the introduction into the same of dynamos, and steam-engines, or other sources of power for operating the same.

My present invention is designed to overcome this inconvenience and to admit of the easy and comfortable transportation of welding and other metal working apparatus, but more especially the former, from place to place along a line structure, and this object I attain by providing an independent or fixed line extending along the line structure contemplated, and charged with currents which are available along the entire line or at predetermined points thereof and may be used either directly for producing the weld, or other desired union, or which may be transformed by induction into currents of the requisite volume and tension for welding. It is, therefore, only necessary to tap the independent or permanent line at the point required, so as to connect it with the welding apparatus, which thus is reduced to welding clamps, or to welding clamps combined with a transformer, and provided with the necessary means for regulating the current.

Welding apparatus of the character herein described, which does not comprise the ultimate source of current, can be easily and conveniently transported, since it is both simple and compact, and can readily be used in situations inaccessible to an equipment carrying its own source of current. Moreover, work may be carried on at the same time at different portions of the structure, and with economy and expedition. All this will more fully appear from the following detailed description, in which reference is made to the accompanying drawings which illustrate my system as applied to the formation of continuous electric line conductors placed in conduits, and to the formation of continuous lines of pipe in trenches; but it will be understood that this system is equally applicable to the building of overhead telephone, telegraph, electric railway, electric light, and other electric or non-electric line structures, as well as for repairing or joining the ends of conductors already in position or use.

Figure 2:
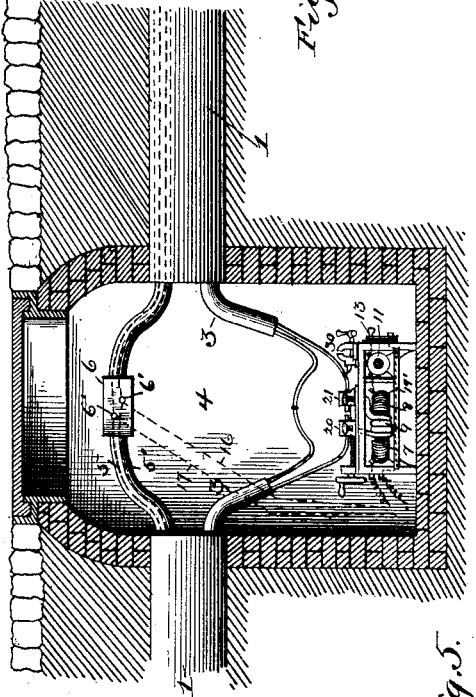
Figure 2:
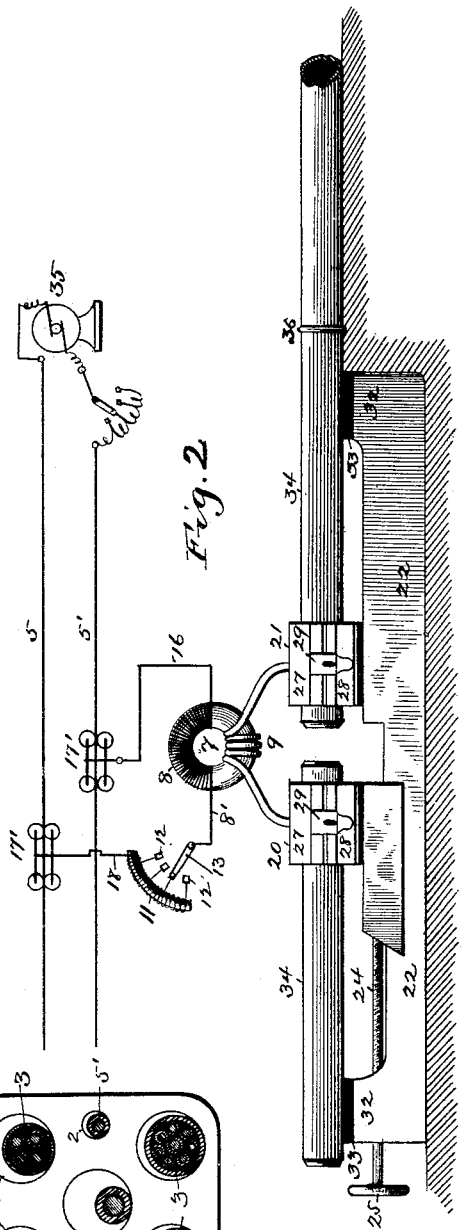
Figure 3:
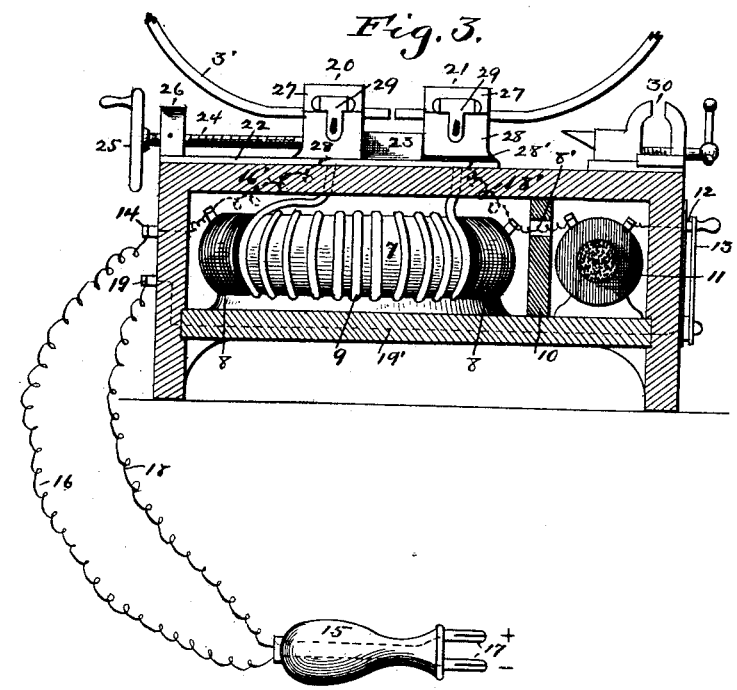
Figure 4:
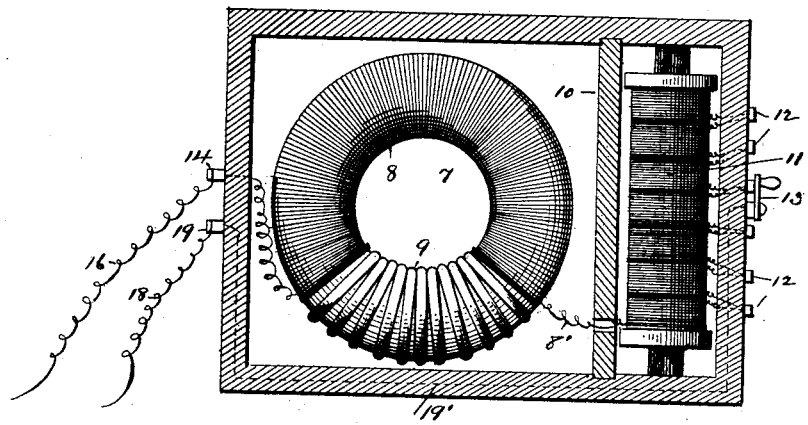

Figure 1, represents a sectional view, partly in elevation, of a portion of an underground conduit for electric conductors of all kinds, and equipped with a permanent line carrying the welding currents and showing my improved portable welding apparatus in position for uniting sections of the conductors contained within the conduit. Fig. 2, is an elevation, partly in diagram, of an apparatus designed more especially for welding together sections of pipe. Fig. 3, is a sectional elevation of the welding apparatus shown in Fig. 1. Fig. 4, is a sectional plan of the same; and Fig. 5, is an end view of a conduit for electric conductors showing in cross-section a number of such conductors, together with the permanent line charged with the welding currents in place in the conduit.

Like numerals of reference indicate like parts throughout all the drawings.

Figure 5:
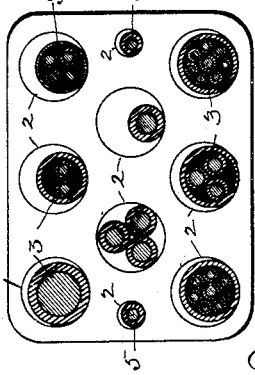

Referring now more particularly to Figs. 1, 3, 4 and 5, there is shown an underground conduit 1, built in any desired or improved manner, and having any desired cross-section. By preference, but not necessarily so, the conduit will be built rectangular in shape, with the corners rounded off, as indicated in Fig. 5, and provided with separate passages 2, each constructed to receive one or more electric conductors or cables 3, to be used for telegraphic, telephonic, or electric lighting purposes, or for the transmission of electrical energy to a distance generally. These conductors or cables are introduced into the passages provided for them, at man-holes 4, 4', in the usual manner, in sections extending from one man-hole to the next throughout the whole length of the conduit, and in accordance with my invention the ends of these conductors or cables are then welded together within the man-holes. For this purpose, there are placed in the conduit, as a permanent equipment of the same, two electric conductors 5, 5', which form the circuit for currents generated at some fixed point on the line, or at the end of the line, as is found most convenient, and in each man-hole these two permanent line conductors are placed conveniently close together, as shown in Fig. 1, upon a switch-board 6, provided with plug holes 6', 6', by which the permanent line may be tapped, as will hereinafter more fully appear. Instead of the plug holes 6', 6', binding-posts, terminal clamps, or any equivalent connecting means may obviously be used. By preference, the permanent line is charged with alternating currents of high tension, and if that is the case, the welding apparatus is formed, as indicated in the man-hole 4, in Fig. 1, and shown in enlarged views in Figs. 3 and 4.

Mounted within a box or inclosing case, preferably rectangular in shape and provided with feet, as shown, there is a transformer 7, of any approved type and construction to receive high tension alternating electric currents in its primary coil 8, which currents are converted into quantity currents of lower tension in the secondary coil 9, of the transformer. Within the case and preferably separated from the transformer by a partition 10, there is a reaction coil 11, the sections of which are connected with contact plates 12, on the outside of the case, in the path of a switch-arm 13. One terminal of the primary coil 8, of the transformer is connected to a binding-post 14, on the outer side of the case, and the said post is connected to a plug 15, by means of a flexible conductor 16; the other terminal of the coil 8, is connected to one end of the reaction coil 11, by a conductor 8'. The plug 15, is provided with two exposed metallic split jack-pin terminals 17, 17, one being connected to the flexible conductor 16, and the other to another flexible conductor 18, leading to a binding-post 19, on the case, the said binding-post being in turn connected to the switch-arm 13, by a conductor 19', shown in dotted lines. The terminals of the secondary coil 9, of the transformer are connected to welding clamps 20, 21, mounted on the top of the case, on a bed or base piece 22, the clamp 21, being fixed and the clamp 20, adjustable to and from the said fixed clamp 21, on a guide 23, on the bed 22, the clamps being insulated from each other, as shown at 28'. The clamp 20, is adjusted on its bed by means of a screw-rod 24, provided at one end with a hand-wheel or crank 25, and at the other end entering a nut formed in the clamp 20; the rod 24, is held against longitudinal movement by a suitable bearing 26, formed on one end of the bed 22. Each clamp is composed of two jaws 27, 28, hinged together and locked one to the other by a latch arm 29, in the manner shown and described in my aforesaid Letters Patent. The bearing faces of the jaws, which may be made removable, are formed to receive and hold electric conductors of any desired shape, and in Figs. 1 and 3, the ends 3', of such conductors are shown secured in the clamps, in position to be brought into contact by a suitable manipulation of the hand-wheel 25, and are then welded together by the passage through the abutting ends, of an electric current of proper heating effect.

The welding apparatus described with reference to Figs. 3 and 4, is also provided with a combined vise and anvil 30, or other tools, to be used as occasion requires.

An apparatus thus constructed is used as follows:—When the conductors or cables 3, are properly placed in the conduit, with their free ends in the man-holes, as hereinbefore described, the portable welding apparatus is carried to one man-hole, and placed either at the bottom of it, as shown, or it may be suitably supported upon a shelf or other rest projecting from one of the walls of the man-hole, according to the position of the wires to be united. It may also be placed near the opening of the man-hole, either outside or within the same, when used to join wires or cables before the latter are placed in or drawn through the conduit. The conductors or cables 3, are longer than is required for bridging the man-hole, and the ends of the same are bared and inserted and clamped in the welding clamps 20, 21, respectively. The plug 15, is then applied to the switch-board 6, that is to say, the jack-pins 17, 17, are inserted into the plug holes 6', 6', whereby the permanent line 5, 5', is tapped by the primary coil of the converter. The movable clamp 20, is now adjusted to bring the ends 3', of the conductors 3, in abutment, pressing the same into contact with moderate pressure, which is maintained until the end of the operation, the switch-arm 13, being meanwhile moved over the terminals of the reaction coil regulator, so as to control the current flowing through the primary coil, and graduate the strength of the current induced in the secondary circuit, according to the requirements of the work in hand. In this manner, one section of a conductor 3, is welded to the other, and in the same manner all conductor sections terminating at the man-hole are welded. The plug 15, is then withdrawn, and the welding apparatus is ready to be moved to the next man-hole for a repetition of the same operation.

In the drawings, the ends 3', of the conductor sections are shown much longer than is required in practice, but in all cases, these conductors when welded together will form a loop or festoon, as shown; and it will be understood that the portions which had been bared for welding, will be again wrapped with suitable insulation, as indicated at 31.

In will be understood that the welding apparatus is employed in the same manner for making joints or cross connections between the wires of one conduit and those of another, whether such connections are made at the time the wires are originally laid or subsequently thereto.

It will furthermore be understood, that the welding apparatus described, may and is intended to be likewise employed to produce soldered or brazed joints between the wires of the same or different lines or cables, instead of welded joints, with equal facility, when these are desired. In such case, the ends of the wires to be joined are clamped as already described, the current derived from the fixed line serving to heat the same to the required soldering or brazing temperature, a suitable flux and the desired soldering or brazing compound being applied to the joint either before or during the heating operation. In the same way, wires that have been soldered, may be separated, and if desired, connected to other wires, by first clamping the wire at either side of the joint in the welding jaws and passing a current of the proper strength across the joint to soften the same, the same source of current and portable apparatus serving for any and all of these operations. By this method, the use of twisted or spiral joints may be dispensed with, and a durable and uniform joint produced. If the permanent line 5, 5', is charged with a continuous current of the requisite volume for welding, soldering or brazing directly with the same, then the transformer is omitted, and instead of the reaction coil 11, a simple rheostat is employed to regulate the strength of the welding current. In this case, the conductor 16, leading to the plug 15, is continued from the binding-post 14, directly to the welding clamp 20, and the conductor 8', coming from one terminal of the rheostat is directly connected with the welding clamp 21. These connections are indicated in Fig. 3, at 16', 18', in dotted lines.

While I have thus far shown my invention only in connection with wires carried in underground conduits, it will be evident that it may likewise be applied in the construction and subsequent maintenance and repair of surface and overhead pole lines. The conductors carrying the welding or metal heating current are preferably carried along the underground or overhead line as the case may be, while the same is in course of construction or immediately upon its completion, the placing and connection of the subsequent conductor sections being carried on by its aid, as already described, at any desired number of points thereof. It will also be evident that wires or conductors of any desired metal or sectional area, may thus be electrically welded or united in one or more single uninterrupted lines of any desired length, and at the same time permanently secured or laid in position, without the imperfections and objectionable features of the joints now in use, or the cumbersome and tedious methods of producing the same.

In Fig. 2, my invention is illustrated mainly in diagram, as applied to the welding together of sections of pipe laid in a trench. The parts composing the apparatus are supposed to be collected and arranged in a box, substantially in the manner shown in Figs. 3 and 4, and except as to the means for tapping the permanent line, the devices are practically the same.

There is a bed piece 22, having its ends slightly upturned, as shown at 32, and each provided with a bearing-face 33, of insulating material, forming rests for pipe sections 34, 34, to be welded together, and arranged so as to hold these sections in alignment. The welding clamps 20, 21, are mounted upon this bed 22, in substantially the manner described with reference to Fig. 3.

It will at once be apparent that pipe sections held by the clamps may be readily brought into contact, and on the passage of a suitable current, may be heated to the proper degree and upset, so as to form a welded joint.

An alternating current dynamo 35, or other suitable source of current is located at some distant point, and a permanent overhead line 5, 5', is extended along the line of the trench in which the pipe is to be laid, and this line is tapped by sets of contact rollers or trolleys 17', 17', which, by the conductors 16, 18, convey the current to the primary of the transformer, or, if the current be of sufficient volume, directly to the welding clamps, as the case may be, thus performing in this instance the functions of the plug 15, shown in connection with Fig. 3. It will be clear that the same arrangement is likewise applicable to the electric welding of railway rails, shown in my aforesaid patent and application, and to other line structures.

In the case of welding pipes, the welding clamps 20, 21, are preferably provided with dies of such shape as to leave a slight ridge 36, completely surrounding the pipe outside of the joint, so as to strengthen the same, and render it secure against leakage, and on transferring the welding apparatus to the next joint, that portion of the pipe line which has already been completed may be filled in and covered in the usual manner.

It will be understood, that while I have shown my invention as applied solely to electric welding, soldering and brazing operations, my portable welding apparatus, with its source of heavy current, clamps, &c., may also be used for other electric metal-working operations, such, for example, as electrically heating the metal preparatory to cutting or shaping or otherwise treating the same, as set forth in other pending applications, in addition to electric welding and joining, and I am, therefore, not restricted to the latter in applying the same.

I do not herein claim the method or process of producing continuous line structures herein described, since this forms the subject of a separate application, filed as a division hereof on May 11, 1893.

Having now fully described my invention, I claim and desire to secure by Letters Patent—

1. In a system of electrically heating sections or portions of metallic line structures preparatory to welding, soldering, brazing, shaping or otherwise treating the same, the combination of a permanent line of conductors extending along the line of the structure and charged with suitable currents; a portable metal working or holding apparatus for clamping the sections or portions of the structure to be united or treated, and connections between the said apparatus and the said permanent line conductors, substantially as described.

2. In a system of electrically welding or uniting successive sections of metallic structures, the combination of a permanent line of conductors extending along the line of the structure, and charged with suitable currents; with a portable electric welding or metal-working apparatus, and means for tapping the permanent line by the said apparatus, substantially as described.

3. In a system of electrically welding successive sections of metallic structures, the combination of a permanent line of conductors charged with alternating currents of high tension, and extending along the line of the structure; with a portable welding or metal-working apparatus comprising a transformer, welding or heating clamps, and a current regulator, and means for tapping the permanent line by the primary of the converter, substantially as described.

4. In a system of laying conductors in underground conduits, the combination of a permanent line of conductors established in said conduit, and charged with suitable currents; with a portable welding apparatus, and means for tapping the permanent line by the welding apparatus at the man-holes of the conduit, substantially as described.

5. In a system of electrically welding lines of conductors at the man-holes of underground conduits carrying such conductors, the combination of a permanent line established in the conduit and charged with suitable currents; with a switch-board or connecting terminals for the said line in each man-hole, a portable welding or metal-working apparatus, and a plug or equivalent connection, for tapping the permanent line at the switch-board by the welding apparatus, substantially as described.

6. A portable welding or metal-working apparatus, comprising an inductional converter and a reaction coil housed within a casing, welding or heating clamps constituting the terminals of the secondary of the converter, mounted upon the casing, and a tapping plug flexibly connected with or constituting the terminals of the primary of the converter, substantially as described.

In testimony whereof I have signed my name to this specification in the presence of two subscribing witnesses.

ELIAS E. RIES.

Witnesses:
JNO. T. MADDOX,
A. H. HENDERSON.